(12) United States Patent
Herrington et al.

(10) Patent No.: US 8,286,860 B2
(45) Date of Patent: Oct. 16, 2012

(54) NEGOTIABLE INSTRUMENT TO PRESENTATION INSTRUMENT VALUE PORTING SYSTEMS AND METHODS

(75) Inventors: Mark Herrington, Memphis, TN (US); Mark V. Putman, Memphis, TN (US); Richard Jackman, Collierville, TN (US)

(73) Assignee: Money Network Financial, LLC, Cordova, TN (US)

( * ) Notice: Subject to any disclaimer, the term of this patent is extended or adjusted under 35 U.S.C. 154(b) by 336 days.

(21) Appl. No.: 11/935,976

(22) Filed: Nov. 6, 2007

(65) Prior Publication Data

US 2008/0185427 A1 Aug. 7, 2008

Related U.S. Application Data

(60) Provisional application No. 60/864,714, filed on Nov. 7, 2006.

(51) Int. Cl.
*G06Q 40/00* (2006.01)
*G07D 11/00* (2006.01)
*G07F 19/00* (2006.01)

(52) U.S. Cl. ............... 235/379; 235/375; 705/45

(58) Field of Classification Search ............ 235/379, 235/380, 375, 487; 705/39, 44, 45
See application file for complete search history.

(56) References Cited

U.S. PATENT DOCUMENTS

| | | |
|---|---|---|
| 4,256,955 A | 3/1981 | Giraud et al. |
| 4,321,672 A | 3/1982 | Braun et al. |
| 4,700,055 A | 10/1987 | Kashkashian, Jr. |
| 4,837,422 A | 6/1989 | Dethloff et al. |
| 4,900,903 A | 2/1990 | Wright et al. |
| 5,155,342 A | 10/1992 | Urano |
| 5,231,569 A | 7/1993 | Myatt et al. |
| 5,393,963 A | 2/1995 | Thomas et al. |
| 5,457,305 A | 10/1995 | Akel et al. |
| 5,483,445 A | 1/1996 | Pickering |
| 5,500,513 A | 3/1996 | Langhans et al. |
| 5,513,102 A | 4/1996 | Auriemma |
| 5,537,314 A | 7/1996 | Kanter |
| 5,546,523 A | 8/1996 | Gatto |
| 5,590,038 A | 12/1996 | Pitroda |

(Continued)

FOREIGN PATENT DOCUMENTS

EP 0 540 234 A2 5/1993

(Continued)

OTHER PUBLICATIONS

Air Miles Service Center, "Terms & Conditions of The AIR MILES® Reward Program," 1 page, May 1998.

(Continued)

*Primary Examiner* — Edwyn Labaze
(74) *Attorney, Agent, or Firm* — Kilpatrick Townsend & Stockton LLP

(57) ABSTRACT

A method of porting value from a negotiable instrument to a presentation instrument includes acquiring information from the negotiable instrument, acquiring information from the presentation instrument, sending at least a portion of the information from the negotiable instrument to a check processor, receiving a message from the check processor that identifies whether the negotiable instrument has been associated with a Positive Pay File, and, based at least in part on the message from the check processor, determining an amount of value to credit to an account associated with the presentation instrument.

21 Claims, 2 Drawing Sheets

U.S. PATENT DOCUMENTS

| | | | |
|---|---|---|---|
| 5,613,012 A | 3/1997 | Hoffman et al. | |
| 5,614,703 A | 3/1997 | Martin et al. | |
| 5,621,640 A | 4/1997 | Burke | |
| 5,649,117 A | 7/1997 | Landry | |
| 5,650,604 A | 7/1997 | Marcous et al. | |
| 5,684,965 A | 11/1997 | Pickering | |
| 5,770,843 A | 6/1998 | Rose et al. | |
| 5,783,808 A | 7/1998 | Josephson | |
| 5,826,243 A | 10/1998 | Musmanno et al. | |
| 5,859,419 A | 1/1999 | Wynn | |
| 5,864,830 A | 1/1999 | Armetta et al. | |
| 5,873,072 A | 2/1999 | Kight et al. | |
| 5,897,625 A | 4/1999 | Gustin et al. | |
| 5,914,472 A | 6/1999 | Foladare et al. | |
| 5,920,847 A | 7/1999 | Kolling et al. | |
| 5,943,656 A | 8/1999 | Crooks et al. | |
| 5,953,710 A | 9/1999 | Fleming | |
| 5,970,480 A | 10/1999 | Kalina | |
| 5,978,780 A | 11/1999 | Watson | |
| 5,999,596 A | 12/1999 | Walker et al. | |
| 5,999,624 A | 12/1999 | Hopkins | |
| 6,012,048 A | 1/2000 | Gustin et al. | |
| 6,021,943 A | 2/2000 | Chastain | |
| 6,035,285 A | 3/2000 | Schlect et al. | |
| 6,044,360 A | 3/2000 | Picciallo | |
| 6,049,782 A | 4/2000 | Gottesman et al. | |
| 6,081,790 A | 6/2000 | Rosen | |
| 6,108,641 A | 8/2000 | Kenna et al. | |
| 6,128,599 A | 10/2000 | Walker et al. | |
| 6,128,602 A | 10/2000 | Northington et al. | |
| 6,128,603 A | 10/2000 | Dent et al. | |
| 6,226,623 B1 | 5/2001 | Schein et al. | |
| 6,243,689 B1 * | 6/2001 | Norton | 705/18 |
| 6,292,789 B1 | 9/2001 | Schutzer | |
| 6,304,860 B1 | 10/2001 | Martin, Jr. et al. | |
| 6,311,170 B1 | 10/2001 | Embrey | |
| 6,327,577 B1 | 12/2001 | Garrison et al. | |
| 6,422,462 B1 | 7/2002 | Cohen | |
| 6,647,376 B1 * | 11/2003 | Farrar et al. | 705/45 |
| 6,829,588 B1 | 12/2004 | Stoutenburg et al. | |
| 7,050,996 B1 | 5/2006 | Blagg et al. | |
| 7,076,465 B1 | 7/2006 | Blagg et al. | |
| 7,128,259 B2 * | 10/2006 | Clark | 235/379 |
| 7,257,246 B1 * | 8/2007 | Brodie et al. | 382/137 |
| 7,497,372 B1 * | 3/2009 | Robinson et al. | 235/379 |
| 2002/0178112 A1 * | 11/2002 | Goeller et al. | 705/39 |
| 2003/0093368 A1 | 5/2003 | Manfre et al. | |
| 2004/0030607 A1 | 2/2004 | Gibson | |
| 2004/0236688 A1 * | 11/2004 | Bozeman | 705/42 |
| 2005/0109833 A1 | 5/2005 | Page | |
| 2005/0121510 A1 * | 6/2005 | Higgins | 235/379 |
| 2005/0125295 A1 | 6/2005 | Tidwell et al. | |
| 2005/0197945 A1 * | 9/2005 | Harper | 705/35 |
| 2006/0006224 A1 | 1/2006 | Modi | |
| 2007/0000994 A1 * | 1/2007 | Michelassi et al. | 235/379 |
| 2007/0057035 A1 | 3/2007 | Jackman et al. | |
| 2007/0095894 A1 * | 5/2007 | Kerridge | 235/379 |
| 2008/0306867 A1 * | 12/2008 | Lyons et al. | 705/40 |

FOREIGN PATENT DOCUMENTS

| | | |
|---|---|---|
| EP | 0 725 376 A2 | 8/1996 |
| WO | WO 97/43893 A1 | 11/1997 |

OTHER PUBLICATIONS

Andrejczak, Matt, "Va. Bank Aims to Gain Accounts Through Pact With Debit Card Issuer," American Banker, vol. 164, No. 93, 2 pages, May 17, 1999.

Barish, William, "Debit Cards: A Personal Perspective," www.americanpayroll.org, pp. 18-20, Apr. 2002.

Brockman, Todd J., "Card-Based Payroll Solutions: A Cost Effective Alternative to Paychecks," www.americanpayroll.org, pp. 22-23, Apr. 2002.

Comdata Corporation, "Payroll & Electronic Funds Distribution Solutions: Eliminate the High-Cost of Paper Payroll Distribution," 1 page, no date.

First Data Corp., "Tran$Pay$^{SM}$ . . . Soon to Be The Western Union® Pay Card," 1 page, no date.

Green, Lisbeth K., "Payroll Cards: How and Why to Make Them Work for Your Organization," www.americanpayroll.org, 3 pages, Apr. 2002.

IPS Card Solutions, Inc., "FDX-400 Remote Payroll Distribution," 1 page, no date.

McEnaney, Maura, "Modular ATM Gives Boost to Diebold," Akron Beacon Journal, 3 pages, Jul. 12, 1997.

White, Ron, "How Computers Work," Fourth Edition, 38 pages, Sep. 1998.

* cited by examiner

NEGOTIABLE INSTRUMENT TO PRESENTATION INSTRUMENT VALUE PORTING SYSTEMS AND METHODS

CROSS-REFERENCES TO RELATED APPLICATIONS

This application is a non-provisional, and claims the benefit, of commonly assigned U.S. Provisional Application No. 60/864,714, filed Nov. 7, 2006, entitled "Negotiable Instrument To Presentation Instrument Value Porting Systems And Methods," the entirety of which is herein incorporated by reference for all purposes.

This application is related to the following co-pending, commonly-assigned U.S. patent application Ser. No. 11/223,441, filed Sep. 9, 2005, entitled, "Enhanced Pre-Allocated Check Negotiability Systems And Methods," and U.S. patent application Ser. No. 11/834,457, filed Aug. 6, 2007, entitled "Payer-Based Account Porting To Portable Value Distribution Systems And Methods," which is a non-provisional and claims the benefit of U.S. Provisional Application No. 60/821,485, filed Aug. 4, 2006, entitled "Employer-Based Account Porting To Portable Payroll Card Systems And Methods," the entirety of each of which is herein incorporated by reference for all purposes.

BACKGROUND OF THE INVENTION

Some estimates indicate that fifty-six million (56,000,000) workers in the U.S. do not have a traditional banking relationship. But these "unbanked" individuals nevertheless need to function in a society heavily dependent on efficient financial transactions. This is becoming increasingly difficult to accomplish using cash as the medium of monetary exchange.

It is not uncommon for unbanked individuals to be paid by employers with negotiable instruments. It is often inconvenient, however, to convert negotiable instruments to cash. For these and other reasons, systems and methods are needed that allow unbanked individuals to complete financial transactions more efficiently.

BRIEF SUMMARY OF THE INVENTION

Embodiments of the present invention provide a negotiable instrument to presentation instrument value porting system. The system includes means for obtaining information from a negotiable instrument, means for obtaining information from a presentation instrument, means for communicating the information from the negotiable instrument to a check verification entity, and means for porting an amount of value from the negotiable instrument to an account associated with the presentation instrument based on a response from the check verification entity. In some embodiments, the negotiable instrument is made for a value and the amount of value ported from the negotiable instrument to the account associated with the presentation instrument based on the response from the check verification entity is equal to the value of the negotiable instrument. The amount of value ported from the negotiable instrument to the account associated with the presentation instrument based on the response from the check verification entity may be equal to the value of the negotiable instrument minus a fee, a portion of the value of the negotiable instrument, or a portion of the value of the negotiable instrument minus a fee. The system may include means for communicating the information from the negotiable instrument to a check processor and means for porting value from the negotiable instrument to the presentation instrument based on a response from the check processor. The negotiable instrument may be a personal check, a payroll check, or the like.

Other embodiments provide a method of porting value from a negotiable instrument to a presentation instrument. The method includes acquiring information from the negotiable instrument, acquiring information from the presentation instrument, sending at least a portion of the information from the negotiable instrument to a check processor, receiving a message from the check processor that identifies whether the negotiable instrument has been associated with a Positive Pay File, and, based at least in part on the message from the check processor, determining an amount of value to credit to an account associated with the presentation instrument. The method may include, based on the message, determining whether to send the information from the negotiable instrument to a check verification entity, sending the information from the negotiable instrument to the check verification entity, receiving a message from the check verification entity, and, based at least in part on the message from the check verification entity, determining an amount of value to credit value to an account associated with the presentation instrument. The negotiable instrument may be made for a value and the amount of value to credit to the account associated with the presentation instrument may be equal to the value, equal to the value minus a fee, equal to a portion of the value, or equal to a portion of the value minus a fee. The negotiable instrument comprises may be a personal check, a payroll check, or the like. The presentation instrument may be a stored value card.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
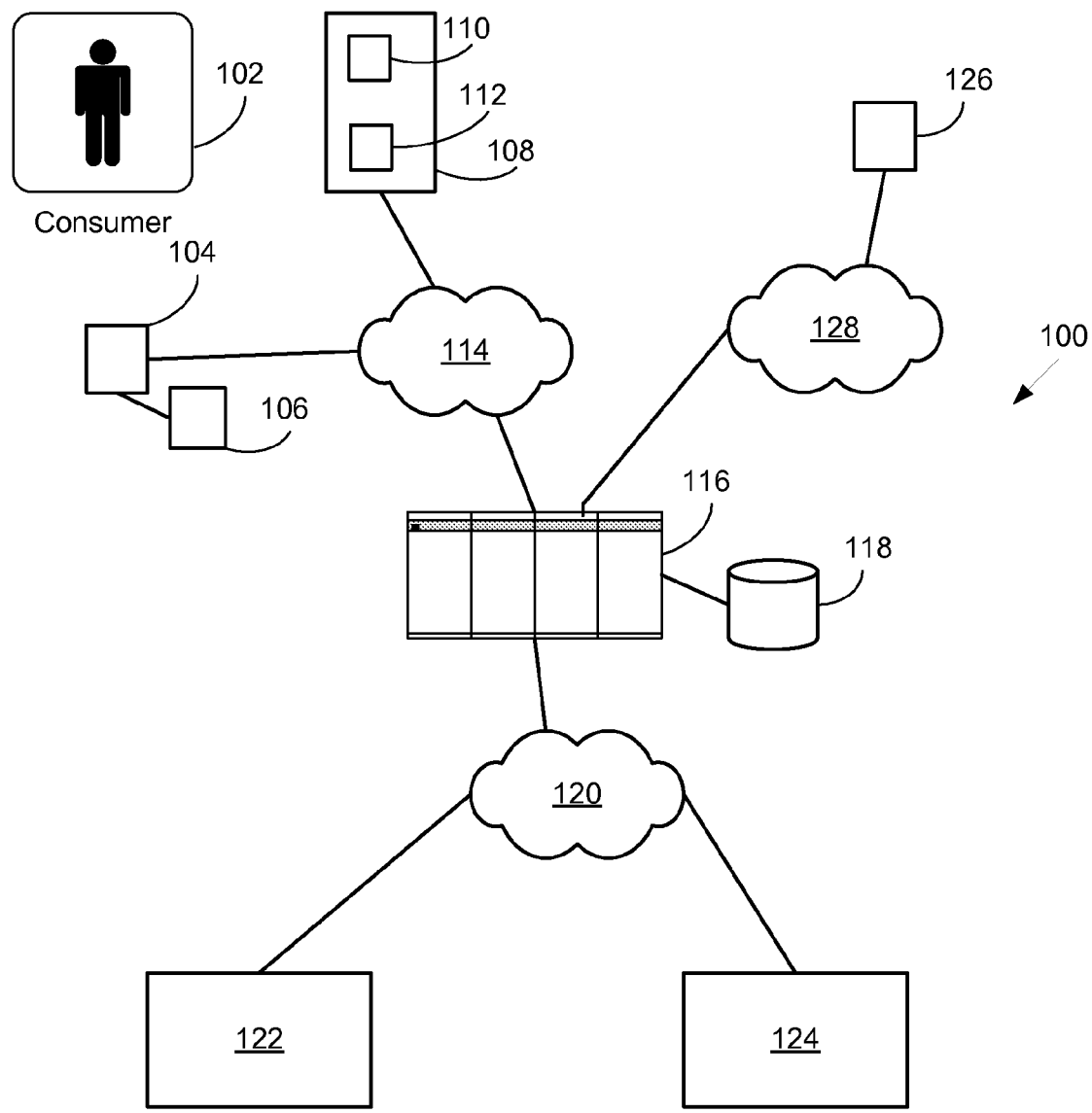
FIG. 1 illustrates an exemplary check to card value porting system according to embodiments of the invention.

The present invention relates to systems and methods for converting value associated with a negotiable instrument to value associated with a presentation instrument. The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

According to embodiments of the invention, a customer access either a Point-of-Sale device or a kiosk using a presentation instrument and tenders a negotiable instrument for scanning by a check reader associated therewith. The device, perhaps through a host computer system, routes check information associated with the negotiable instrument to a check processor. If the check processor identifies the negotiable instrument as being on a Positive Pay File and confirms the validity of an amount, and perhaps a number associated therewith, then the value of the negotiable instrument, perhaps less a fee, is credited to an account associated with the presentations instrument. The customer may thereafter use the presentation instrument in the traditional way such presentation instruments are used.

If the check processor is unable to confirm that the negotiable instrument is listed on a Positive Pay File and/or is unable to confirm the validity of the amount and/or number, then the check information is routed to a check verification entity. The check verification entity attempts to verify the negotiable instrument and may approve the negotiable instrument for full payment, partial payment, or no payment. Based on the message, the value associated with the negotiable instrument, perhaps less a fee, a portion of the value of the negotiable instrument, perhaps less a fee or a portion of the fee commensurate with the portion of the value, or no value is credited to an account associated with the presentations instrument. If only a portion of the value is credited, the remainder of the value, perhaps less the remainder of the fee, is thereafter credited to the account once the negotiable instrument "clears." In either case in which value is credited, the customer may thereafter use the presentation instrument in the traditional way such presentation instruments are used.

Having described embodiments of the invention generally, attention is directed to FIG. 1, which illustrates an exemplary system 100 according to embodiments of the invention. Those skilled in the art will appreciate that the system 100 is merely exemplary of a number of possible embodiments. A customer 102 accesses the system 100 using either a POS device 104, having a check reader 106 associated therewith, or a kiosk 108. The POS 104 also has a presentation instrument reader (e.g., card swipe reader) integral therewith. The kiosk 108 has a presentation instrument reader 110 and a check reader 112 integral therewith. Hence, using either device, the customer is able to provide the system 100 with check information from a negotiable instrument and account information from a presentation instrument.

The POS 104 and kiosk 108 are communicably coupled via a network to a host computer 116 that has a storage arrangement 118 associated therewith. The network 114 may be the Internet, the Public Switched Telephone Network, a money transfer network, or any of a variety of other suitable networks. The host computer 116 may be any of a variety of suitable computing devices. The storage arrangement 118 may be any suitable electronic storage device or devices.

The host computer 116 is communicably coupled via a network 120 to one or more check processors 122, and one or more check verification entities 124. The network 120 may be the same network as the network 114 or other suitable network. The check processor 122 may be any entity that processes negotiable instruments. The check verification entity 124 may be any entity that provides a check verification service similar to the service provided by TeleCheck® of Houston, Tex.

The host computer 116 is also communicably coupled via a network 128 to a variety of merchants 126. The network 128 may be the same network at the networks 114, 120 or other suitable network. The merchant 126 includes any merchant that accepts presentation instruments of the variety used by the consumer 102 to receive the value of a negotiable instrument.

Figure 2:
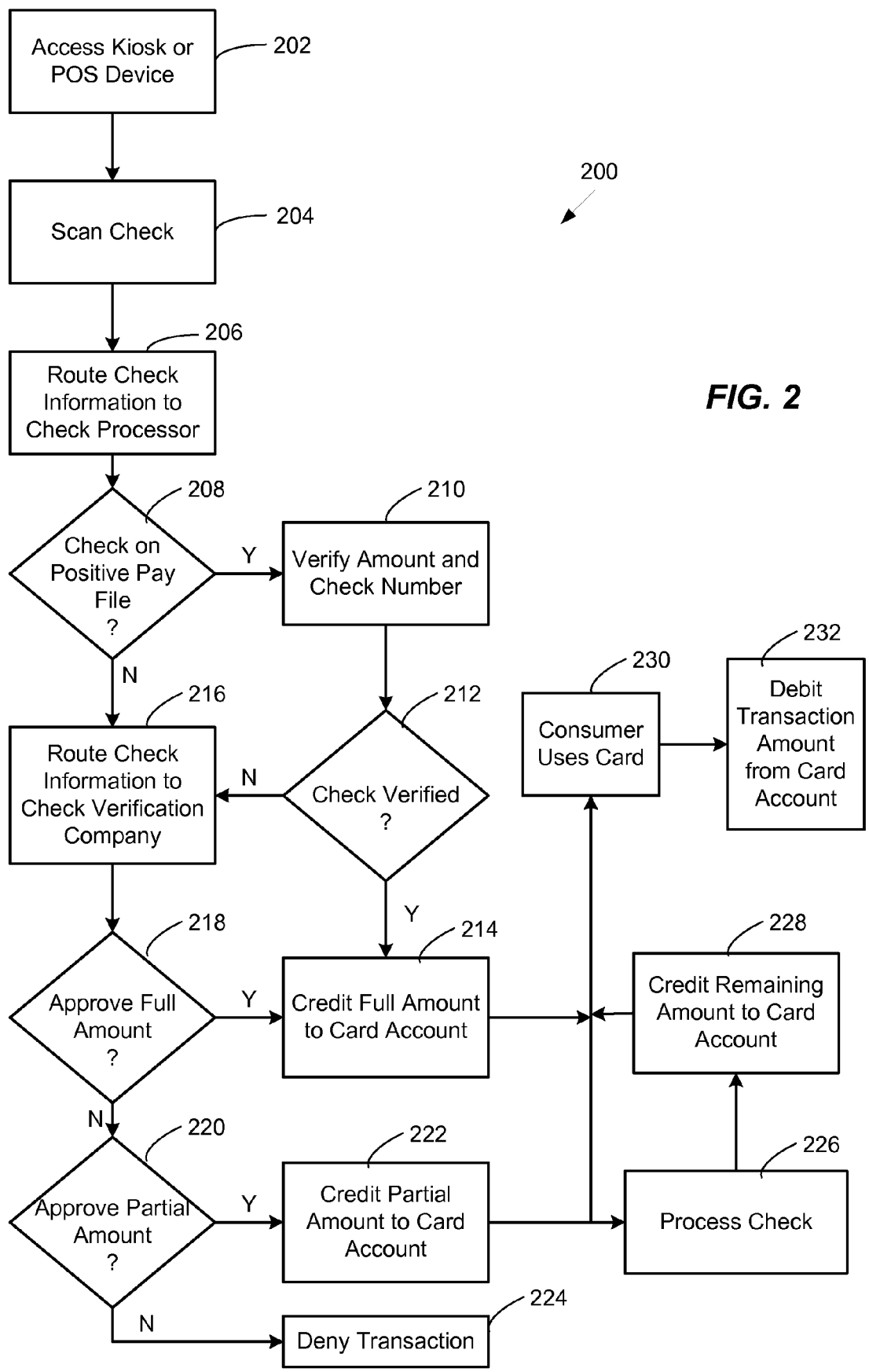
FIG. 2 illustrates an exemplary check to card value porting method according to embodiments of the invention, which method may be implemented in the system of FIG. 1.

Having described an exemplary system 100 according to embodiments of the invention, attention is directed to FIG. 2, which depicts an exemplary method 200 according to embodiments of the invention, which method may be implemented in the system 100. The ensuing description of the method 200 will, by way of example, relate to porting value from a check to a stored value account. Those skilled in the art, however, will appreciate that any of a variety of negotiable instruments (money orders, payroll checks, personal checks, third party checks, etc.) and/or any of a variety of presentations instruments (credit cards, debit cards, etc.) may be used in other exemplary methods.

The method 200 begins at block 202, at which point a consumer accesses a POS device, such as the POS device 104 of FIG. 1, a kiosk, such as the kiosk 108 of FIG. 1, or other properly equipped device (hereinafter "device"). The consumer may, for example, use the stored value card and an associated Personal Identification Number (PIN) to access the device. In some embodiments the consumer may be assisted by a clerk.

Once the consumer obtains access to the device, the consumer tenders a check for scanning. This takes place at block 204. In the process of scanning the check, the device, or a check scanner, such as the scanner 106 or the scanner 112 of FIG. 1, associated therewith, acquires check information from the check. The check information may include: an account number, an American Bankers Association (ABA) routing number, a check number, an amount, and/or the like. The check information may be acquired from the check using MICR (Magnetic Ink Character Recognition) technology, as is known.

At block 206, the check information, or a portion thereof, is routed to a check processor, such as the check processor 122. The check processor, at block 208, determines whether the consumer's check is listed on a Positive Pay File. If so, at block 210 the check processor verifies that the value of the check matches the value posted to the positive pay file. If the check processor is thereby able to verify the value of the check, then the value is posted to an account associated with the stored value card of the consumer at block 214. A fee may be withheld from the posted amount, which may be in relation to the value, may be a flat fee, or may be a combination of a flat fee and a percentage of the value. The consumer is provided a message at the device that tells the consumer how much value was posted to the account, the amount of any fee that was accessed, and the like.

It should be appreciated that the process of verifying the check with the check processor 122 may take any of a variety of forms. For example, rather than routing the check information through the host computer 116, the information may be routed directly from the device to the check processor. The check information sent to the check processor may be limited to the ABA number, the account number, and the check number. The check processor may return to the device or the host computer the value listed on the Positive Pay File, if any, associated with the check. This value then may be posted to the account in a record associated with the account stored on the storage device 118. Many other examples are possible and evident to those skilled in the art in light of this description.

If the check processor is unable to verify the check or the check is no listed on a Positive Pay File, then the check information may be routed to a check verification entity (e.g., TeleCheck®). This may be the check verification entity 124 of FIG. 1. This takes place at block 216. The check verification entity attempts to approve the full amount of the check at block 218. If the check verification entity is able to approve the full value, then the full value is posted to the account at block 214 as discussed above.

If the check verification entity is unable to approve the full value of the check, then the check verification entity attempts to approve a portion of the value at block 220. If so, the partial value is credited to the account at block 222. If only a portion of the value of the check is credited to the account, then any fee may be reduced accordingly. The consumer is provided with a message at the device that informs the consumer of the amount posted, the amount of the fee or partial fee that the consumer was changed, when the remaining value may be posted, a fee associated with the remaining value, and the like.

If only a portion of the value of the check can be posted at the time of the transaction, then the process proceeds at block 226, at which point the check is processed. Assuming the check is processed successfully, the remaining value of the check is posted at block 228. Any remaining fee may be withheld.

At block 230, the consumer may use the stored value card at any merchant that accepts the card. The merchant processes the card in the traditional manner in which such cards are processed. For example, the transaction amount may be sent to the host computer 116, via a transaction processing network, which may be the network 128, and the transaction amount may be debited from the account by updating the record associated with the account. This takes place at block 232. Those skilled in the art will appreciate that may other examples are possible.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A negotiable instrument to presentation instrument value porting system comprising:
 a transaction device which is electronically accessed using a presentation instrument;
 means for electronically obtaining information from a negotiable instrument at the transaction device;
 means for electronically obtaining information from the presentation instrument at the transaction device;
 means for communicating information from the negotiable instrument at the transaction device though a network to a check processor;
 means for receiving a message from the check processor that indicates whether the negotiable instrument has been associated with a Positive Pay File, the Positive Pay File including a value for each of the negotiable instruments associated with the Positive Pay File;
 means for porting the amount of value from the negotiable instrument to an account associated with the presentation instrument based on a response from the check processor that the negotiable instrument is associated with the Positive Pay File;
 means for communicating the information from the negotiable instrument at the transaction device through the network to a check verification entity if the message from the check processor indicates that the negotiable instrument is not associated with the Positive Pay File; and
 means for porting at least a portion of the amount of value from the negotiable instrument to the account associated with the presentation instrument, based on a response from the check verification entity and using the information obtained from the presentation instrument.

2. The system of claim 1, wherein the negotiable instrument is made for a value and wherein the amount of value ported from the negotiable instrument to the account associated with the presentation instrument based on the response from the check verification entity is equal to the value of the negotiable instrument.

3. The system of claim 1, wherein the negotiable instrument is made for a value and wherein the amount of value ported from the negotiable instrument to the account associated with the presentation instrument based on the response from the check verification entity is equal to the value of the negotiable instrument minus a fee.

4. The system of claim 1, wherein the negotiable instrument is made for a value and wherein the amount of value ported from the negotiable instrument to the account associated with the presentation instrument based on the response from the check verification entity is equal to a portion of the value of the negotiable instrument.

5. The system of claim 1, wherein the negotiable instrument is made for a value and wherein the amount of value ported from the negotiable instrument to the account associated with the presentation instrument based on the response from the check verification entity is equal to a portion of the value of the negotiable instrument minus a fee.

6. The system of claim 1, wherein the negotiable instrument is made for a value and wherein the amount of value ported from the negotiable instrument to the account associated with the presentation instrument based on the response from the check processor is equal to the value of the negotiable instrument.

7. The system of claim 1, wherein the negotiable instrument is made for a value and wherein the amount of value ported from the negotiable instrument to the account associated with the presentation instrument based on the response from the check processor is equal to the value of the negotiable instrument minus a fee.

8. The system of claim 1, wherein the negotiable instrument is made for a value and wherein the amount of value ported from the negotiable instrument to the account associated with the presentation instrument based on the response from the check processor is equal to a portion of the value of the negotiable instrument.

9. The system of claim 1, wherein the negotiable instrument is made for a value and wherein the amount of value ported from the negotiable instrument to the account associated with the presentation instrument based on the response from the check processor is equal to a portion of the value of the negotiable instrument minus a fee.

10. The system of claim 1, wherein the negotiable instrument comprises a personal check.

11. The method of claim 1, wherein the negotiable instrument comprises a payroll check.

12. The system of claim 1, wherein the presentation instrument is a card and wherein the means for acquiring information from the presentation instrument comprises a card reader that reads account information from the card.

13. The system of claim 1, wherein the presentation instrument is a stored value card having account information.

14. A method of porting value from a negotiable instrument to a presentation instrument at a transaction device, comprising:
   accessing the transaction device using the presentation instrument;
   acquiring information from the negotiable instrument at the transaction device;
   acquiring information from the presentation instrument at the transaction device;
   sending at least a portion of the information from the negotiable instrument to a check processor;
   receiving a message from the check processor that identifies whether the negotiable instrument has been associated with a Positive Pay File, the Positive Pay File including a value for any negotiable instrument associated with the Positive Pay File;
   based at least in part on the message from the check processor, determining an amount of value to credit to an account associated with the presentation instrument;
   crediting the determined amount of value to the account using the presentation instrument information acquired from the presentation instrument at the transaction device;
   based on the message, determining whether to send the information from the negotiable instrument to a check verification entity;
   sending the information from the negotiable instrument to the check verification entity;
   receiving a message from the check verification entity; and
   based at least in part on the message from the check verification entity, determining an amount of value to credit to an account associated with the presentation instrument.

15. The method of claim 14, wherein the negotiable instrument is made for a value and wherein the amount of value to credit to the account associated with the presentation instrument is equal to the value.

16. The method of claim 14, wherein the negotiable instrument is made for a value and wherein the amount of value to credit to the account associated with the presentation instrument is equal to the value minus a fee.

17. The method of claim 14, wherein the negotiable instrument is made for a value and wherein the amount of value to credit to the account associated with the presentation instrument is equal to a portion of the value.

18. The method of claim 14, wherein the negotiable instrument is made for a value and wherein the amount of value to credit to the account associated with the presentation instrument is equal to a portion of the value minus a fee.

19. The method of claim 14, wherein the negotiable instrument comprises a personal check.

20. The method of claim 14, wherein the negotiable instrument comprises a payroll check.

21. The method of claim 14, wherein the presentation instrument comprises a stored value card.

* * * * *